US011919383B2

(12) United States Patent
Surace et al.

(10) Patent No.: US 11,919,383 B2
(45) Date of Patent: Mar. 5, 2024

(54) THERMAL MANAGEMENT ASSEMBLY OF A VEHICLE

(71) Applicant: INDUSTRIE SALERI ITALO S.P.A., Lumezzane (IT)

(72) Inventors: Alfonso Surace, Lumezzane (IT); Marco Pedersoli, Lumezzane (IT); Simone Cornacchia, Lumezzane (IT)

(73) Assignee: INDUSTRIE SALERI ITALO S.P.A., Lumezzane (IT)

( * ) Notice: Subject to any disclaimer, the term of this patent is extended or adjusted under 35 U.S.C. 154(b) by 220 days.

(21) Appl. No.: 17/642,864

(22) PCT Filed: Oct. 9, 2020

(86) PCT No.: PCT/IB2020/059505
§ 371 (c)(1),
(2) Date: Mar. 14, 2022

(87) PCT Pub. No.: WO2021/074754
PCT Pub. Date: Apr. 22, 2021

(65) Prior Publication Data
US 2022/0379717 A1 Dec. 1, 2022

(30) Foreign Application Priority Data
Oct. 14, 2019 (IT) .................... 102019000018701

(51) Int. Cl.
*B60K 11/02* (2006.01)
*B60K 6/24* (2007.10)
(Continued)

(52) U.S. Cl.
CPC ............... *B60K 11/02* (2013.01); *B60K 6/24* (2013.01); *B60K 6/26* (2013.01); *B60K 6/28* (2013.01);
(Continued)

(58) Field of Classification Search
CPC . B60K 11/02; B60K 6/24; B60K 6/26; B60K 6/28; B60L 58/24; F01P 3/20;
(Continued)

(56) References Cited

U.S. PATENT DOCUMENTS

2014/0374081 A1* 12/2014 Kakehashi ......... B60H 1/00278
429/120
2015/0000327 A1* 1/2015 Kakehashi .......... H01M 10/625
62/434

(Continued)

FOREIGN PATENT DOCUMENTS

GB    2383840 A    7/2003

OTHER PUBLICATIONS

International Search Report and Written Opinion for International Patent Application No. PCT/IB2020/059505, dated Dec. 8, 2020, 10 pages.

*Primary Examiner* — Syed O Hasan
(74) *Attorney, Agent, or Firm* — Armstrong Teasdale LLP

(57) ABSTRACT

A thermal management assembly includes a fluidic command device connected to a first and second pump group and having four inlet and outlet ports and an auxiliary duct connecting the pump groups. The fluidic command device is configurable in a first configuration, in which working fluid flows into the first inlet port and out of the first outlet port, flowing into the first pump group, the auxiliary duct and the second pump group, a second configuration, in which working fluid flows into the second inlet port and out of the second outlet port, flowing in the pump groups, preventing flow in the auxiliary duct, and a third configuration, in which working fluid flows into the third inlet port and out of the third outlet port, flowing into the first pump group, and into the fourth inlet port and out of the fourth outlet port, flowing into the second pump group.

17 Claims, 14 Drawing Sheets

(51) Int. Cl.
- *B60K 6/26* (2007.10)
- *B60K 6/28* (2007.10)
- *B60L 58/24* (2019.01)
- *F01P 3/20* (2006.01)
- *F01P 5/10* (2006.01)
- *F04D 13/12* (2006.01)
- *F04D 15/00* (2006.01)

(52) U.S. Cl.
CPC ............... B60L 58/24 (2019.02); F01P 3/20 (2013.01); F01P 5/10 (2013.01); *F01P 2005/105* (2013.01); *F01P 2060/00* (2013.01); *F04D 13/12* (2013.01); *F04D 15/0005* (2013.01)

(58) Field of Classification Search
CPC .... F01P 5/10; F01P 2005/105; F01P 2060/00; F04D 13/12; F04D 15/0005
See application file for complete search history.

(56) References Cited

U.S. PATENT DOCUMENTS

| | | | |
|---|---|---|---|
| 2015/0101789 A1* | 4/2015 | Enomoto | B60H 1/039 236/35 |
| 2015/0217622 A1* | 8/2015 | Enomoto | F16K 11/076 62/244 |
| 2016/0031291 A1* | 2/2016 | Enomoto | B60K 11/02 62/189 |
| 2016/0167481 A1* | 6/2016 | Makihara | B60H 1/03 237/5 |
| 2016/0339761 A1* | 11/2016 | Enomoto | B60H 1/00899 |
| 2017/0167355 A1 | 6/2017 | Kim et al. | |
| 2019/0160910 A1* | 5/2019 | Mano | F16K 11/085 |
| 2019/0299770 A1 | 10/2019 | Miyoshi et al. | |
| 2021/0129805 A1* | 5/2021 | Abaitancei | F16H 61/4096 |

* cited by examiner

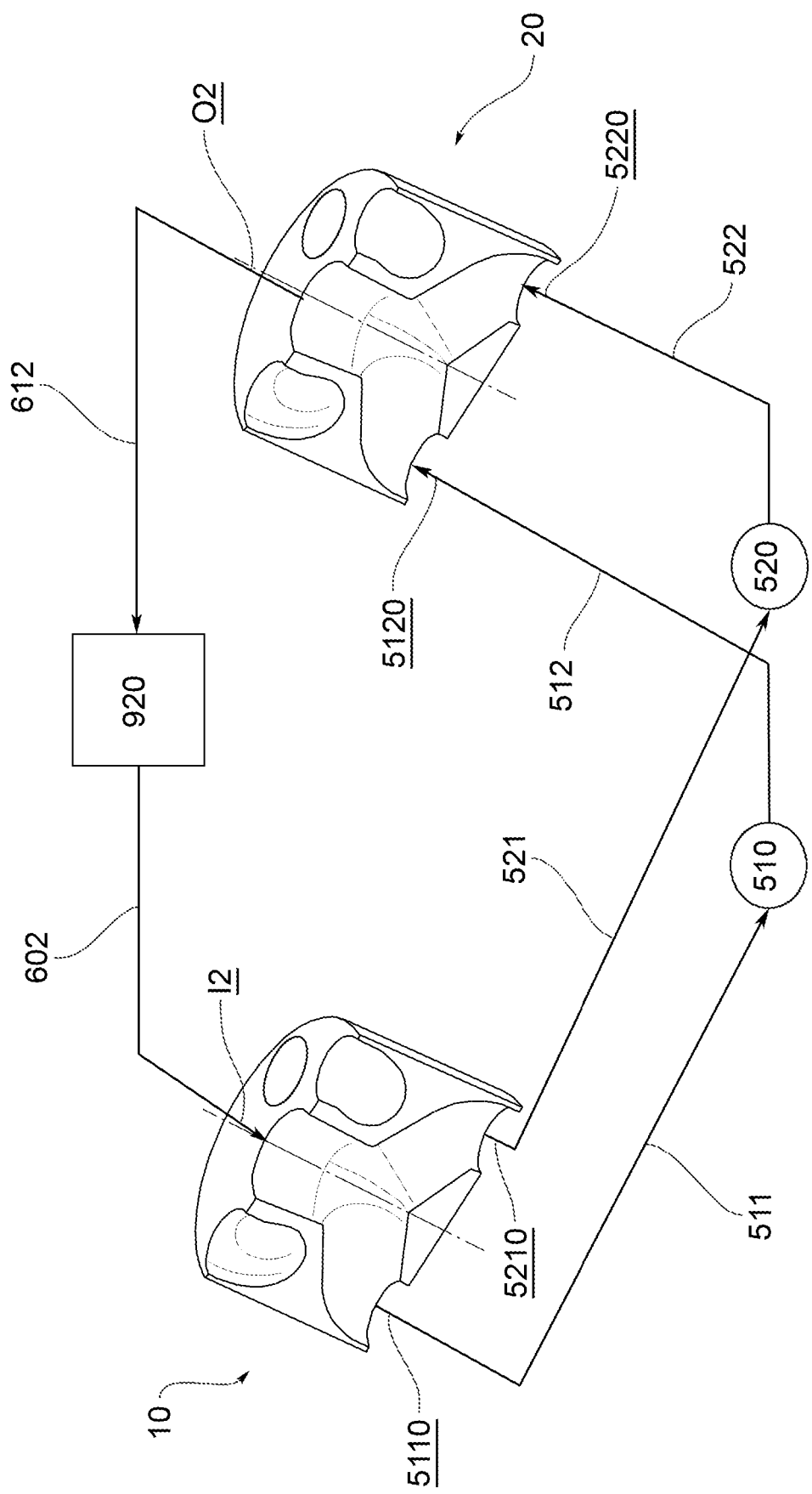

THERMAL MANAGEMENT ASSEMBLY OF A VEHICLE

CROSS-REFERENCE TO RELATED APPLICATIONS

This application is a National Phase application of PCT International Application No. PCT/IB2020/059505, having an International Filing Date of Oct. 9, 2020, which claims priority to Italian Application No. 102019000018701 filed Oct. 14, 2019, each of which is hereby incorporated by reference in its entirety.

FIELD OF THE INVENTION

The present invention relates to a thermal management assembly of a thermal regulation system of a vehicle. Additionally, the present invention relates to the thermal regulation system of a vehicle, which comprises said thermal management assembly. Furthermore, the present invention also relates to a vehicle that comprises said system and comprises said thermal management assembly.

In other words, the present invention relates to the automotive field, and in detail to the thermal regulation system of a vehicle. In particular, the term "vehicle" relates to any means of transport without any limitation as to type or size, i.e. a motor vehicle or a semi-articulated vehicle.

SUMMARY OF THE INVENTION

The need to manage the temperature of the operating groups of the vehicle to take them to and/or keep them in the best possible operating conditions (by cooling and/or heating them) is known from the prior art. In particular, hereinafter, "operating group" means a specific component or group of components for carrying out a given operation required for the motion of the vehicle. Therefore, for example, operating group means the endothermic engine group, or the battery group, or the gearbox group, or the transmission group, or the electric motor group, or the battery group. In particular, in the present discussion, as described in detail below, in some embodiments, an "operating group" comprises one or more components or groups of components also comprised in other distinct "operating groups".

In recent years, hybrid-powered vehicle solutions have proliferated, in which a plurality of operating groups, such as the endothermic engine group, the battery group, and the electric motor group connected to said battery group, are necessarily present, each operating group having different needs. Indeed, each of said operating groups has a mutually different operating behavior, both while the vehicle is in motion and when it is stationary (e.g. the electric motor operates in situations with the endothermic engine in standby). Therefore, it is apparent that each operating group has different needs for thermal management, cooling and/or heating, as a function of the different operating situations of the vehicle and as a function of its physical features.

Vehicle solutions are thus known, which comprise a specific thermal regulation system for each operating group, in which a specific amount of working fluid circulates. In such embodiments, each specific thermal regulation system is designed independently, requiring specific components (e.g. specific pump groups).

In this context, the problem of having, managing, providing, and producing a plurality of thermal regulation systems in the same vehicle is thus apparent.

Therefore, the main problem present in this field is that of having, accommodating, and managing a multitude of components required for the thermal management of each operating group comprised in the same vehicle.

Given the above, the need to solve the aforesaid technical problems is strongly felt.

It is thus the object of the present invention to provide a new thermal management assembly by means of which such a need is met.

Such an object is achieved by a thermal management assembly, a thermal regulation system of a vehicle, and a vehicle as described and claimed herein.

Preferred variants implying further advantageous aspects are also described.

BRIEF DESCRIPTION OF THE DRAWINGS

Further features and advantages of the invention will become apparent from the description provided below of preferred embodiments thereof, given by way of non-limiting examples, with reference to the accompanying drawings, in which:

FIG. 2a' is a further diagrammatic view of the thermal regulation system in FIG. 2a;

FIG. 2b' is a further diagrammatic view of the thermal regulation system in FIG. 2b;

FIG. 2c' is a further diagrammatic view of the thermal regulation system in FIG. 2c;

DETAILED DESCRIPTION

Figure 1A:
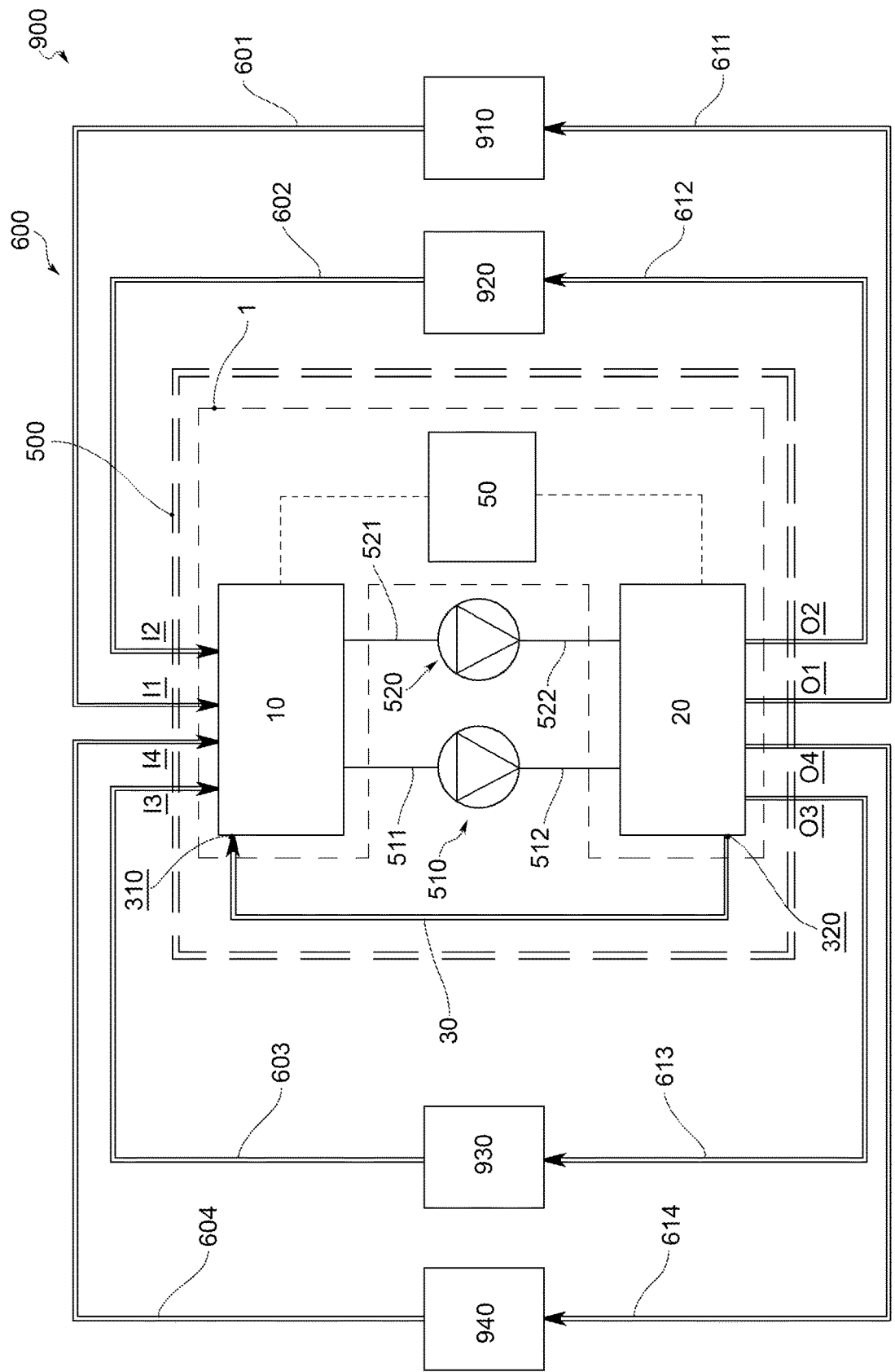
FIG. 1a is a diagrammatic view of a vehicle according to a preferred embodiment of the present invention.
Figure 1B:
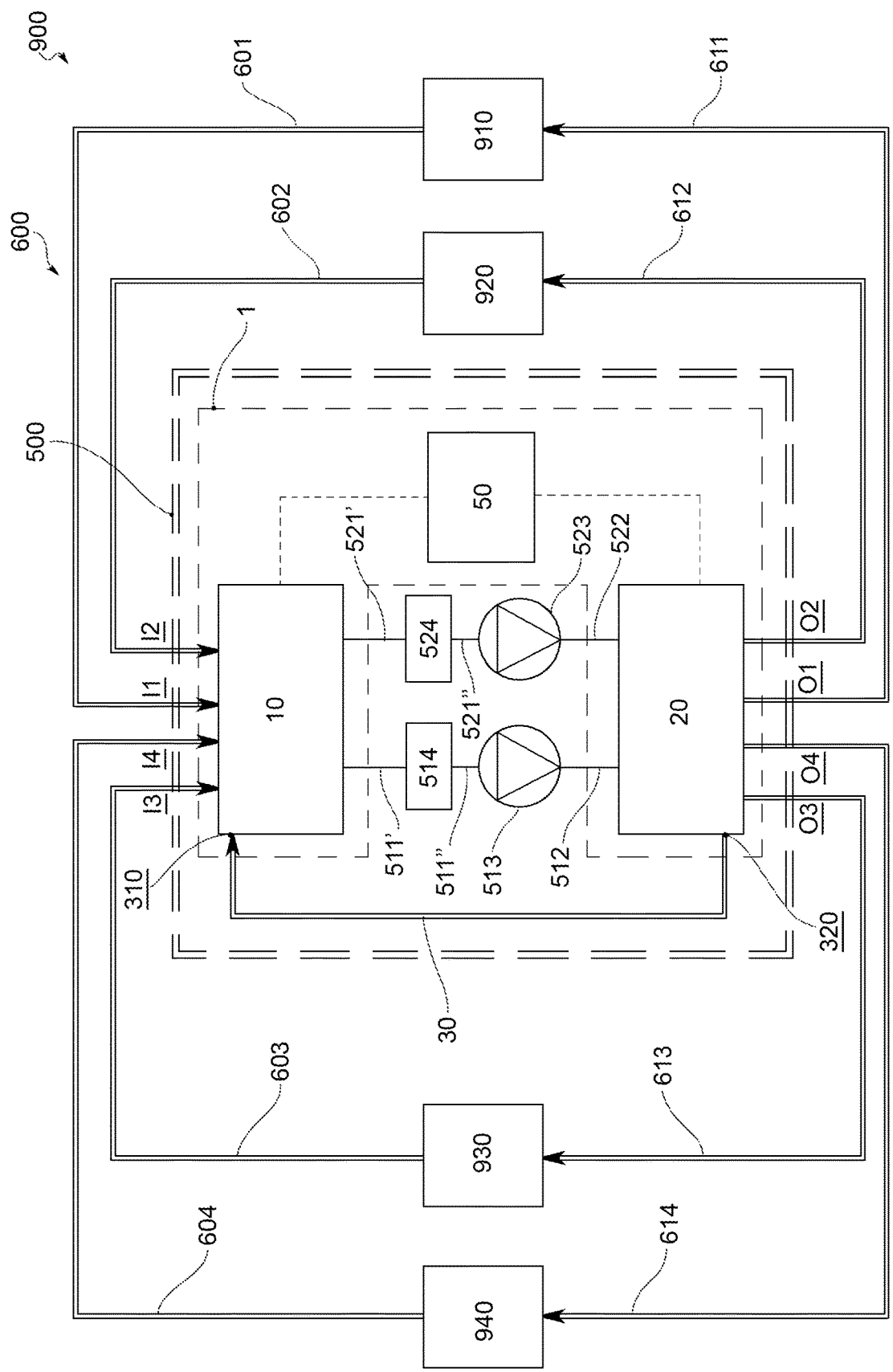
FIG. 1b is a diagrammatic view of a vehicle according to a preferred embodiment of the present invention.

With reference to the accompanying figures, reference numeral 500 indicates as a whole a thermal management assembly of a thermal regulation system 600 of a vehicle 900 (diagrammatically shown in the figures), according to the present invention.

The present invention also relates to the thermal regulation system 600, which comprises the thermal management assembly 500.

The present invention also relates to the vehicle 900 which comprises the thermal regulation system 600. Preferably, said vehicle 900 is hybrid-powered, i.e. is powered in combination by an endothermic engine and at least one electric motor group electrically supplied by a respective battery group. In particular, in the present invention, the vehicle 900 comprises an endothermic engine group with power supply and two electric motor groups powered by two battery groups, respectively.

Preferably, according to the present invention, the vehicle 900 comprises a first operating group 910, a second operating group 920, a third operating group 930, and a fourth operating group 940.

Each operating group corresponds to a "load". In particular, each operating group corresponds to a respective component or group of components comprised in the vehicle and preferably belonging to the power supply of the vehicle.

Preferably, the first operating group 910 is an endothermic engine group.

Preferably, the second operating group 920 comprising a first battery group and a second battery group.

Preferably, the third operating group 930 comprises the first battery group and a first electric motor group.

Preferably, the fourth operating group 940 comprises the second battery group and a second electric motor group.

According to the present invention, the first operating group 910, the second operating group 920, the third operating group 930, and the fourth operating group 940 are fluidically connected to the thermal regulation system 600.

Preferably, the first operating group 910, the second operating group 920, the third operating group 930, and the fourth operating group 940 are fluidically connected by means of a plurality of system ducts 601, 602, 603, 604, 611, 612, 613, 614 comprised in the thermal regulation system 600. Preferably, the thermal regulation system 600 further comprises specific heat exchanger groups (not shown).

According to a preferred embodiment, as shown in the accompanying figures, the thermal regulation system 600 comprises at least one system inlet duct and at least one system outlet duct in fluidic connection with each operating group.

According to the present invention, the thermal management assembly 500 comprises a first pump group 510 suitable to command the motion of the working fluid comprising a first inlet duct 511 and a first outlet duct 512.

Furthermore, according to the present invention, the thermal management assembly 500 comprises a second pump group 520 suitable, in turn, to command the motion of the working fluid comprising a second inlet duct 521 and a second outlet duct 522.

According to a preferred embodiment, the first pump group 510 comprises a first command unit 513 comprising a first impeller, which intercepts the working fluid flowing in the first inlet duct 511 to send it into the first outlet duct 512. Preferably, said first impeller is of the radial type, aspirating working fluid axially through the first inlet duct 511 to push it out tangentially towards the first outlet duct 512.

According to a preferred embodiment, the first pump group 510 further comprises a first stabilization tank 514, which divides the first inlet duct 511 into a first duct upstream section 511' and a first duct downstream section 511". In particular, said first stabilization tank 514 unifies the pressure of the flowing liquid before it reaches the first impeller comprised in the first command unit 513. In other words, the working fluid reaches the first command unit 513 after having flowed in the first stabilization tank 514.

According to a preferred embodiment, the second pump group 520 comprises a second command unit 523 comprising a second impeller, which intercepts the working fluid flowing in the second inlet duct 521 to send it into the second outlet duct 522. Preferably, said second impeller is of the radial type, aspirating working fluid axially through the second inlet duct 521 to push it out tangentially towards the second outlet duct 522.

According to a preferred embodiment, the second pump group 520 further comprises a second stabilization tank 524, which divides the second inlet duct 521 into a second duct upstream section 521' and a second duct downstream section 521". In particular, said second stabilization tank 524 unifies the pressure of the flowing liquid before it reaches the second impeller comprised in the second command unit 523. In other words, the working fluid reaches the second command unit 523 after having flowed in the second stabilization tank 524.

According to a preferred embodiment, the thermal management assembly 500 further comprises a fluidic command device 1 suitable to manage the amounts of working fluid flowing in the thermal management assembly 500.

In particular, the fluidic command device 1 is fluidically connected to the first pair of ducts 511, 512 and to the second pair of ducts 521, 522. Thereby, the fluidic command device 1 is suitable for managing through which of these ducts the working fluid flows.

Furthermore, the fluidic command device 1 is fluidically connectable by means of system ducts to the respective operating groups.

Indeed, the fluidic command device 1 comprises four inlet ports I1, I2, I3, I4, each one being fluidically connectable to a respective operating group 910, 920, 930, 940 to allow the working fluid to enter into the fluidic command device 1. In other words, through the four inlet ports I1, I2, I3, I4, the fluidic command device 1 receives working fluid from the respective operating groups 910, 920, 930, 940.

Furthermore, the fluidic command device 1 comprises four outlet ports O1, O2, O3, O4, each one being fluidically connectable to a respective operating group 910, 920, 930, 940 to allow the working fluid to exit from the fluidic command device 1. In other words, through the four outlet ports O1, O2, O3, O4, the fluidic command device 1 releases working fluid to the respective operating groups 910, 920, 930, 940.

Furthermore, the fluidic command device 1 comprises an auxiliary duct 30, which fluidically connects the first pump group 510 and the second pump group 520. Preferably, the auxiliary duct 30 is a bypass duct, which directly connects the first pump group 510 and the second pump group 520. In other words, the auxiliary duct 30 connects the first pump group 510 directly to the second pump group 520 so that no operating group is fluidically present between the two pump groups.

According to the present invention, the fluidic command device 1 is configurable in a first working configuration, in which the working fluid flows into the first inlet port I1 and flows out from the first outlet port O1, thus preventing the flow through the other inlet ports and the other outlet ports; in said first configuration, the working fluid flows between the first inlet port I1 and the first outlet port O1 into the first pump group 510, the auxiliary duct 30 and the second pump group 520.

Figure 2A:
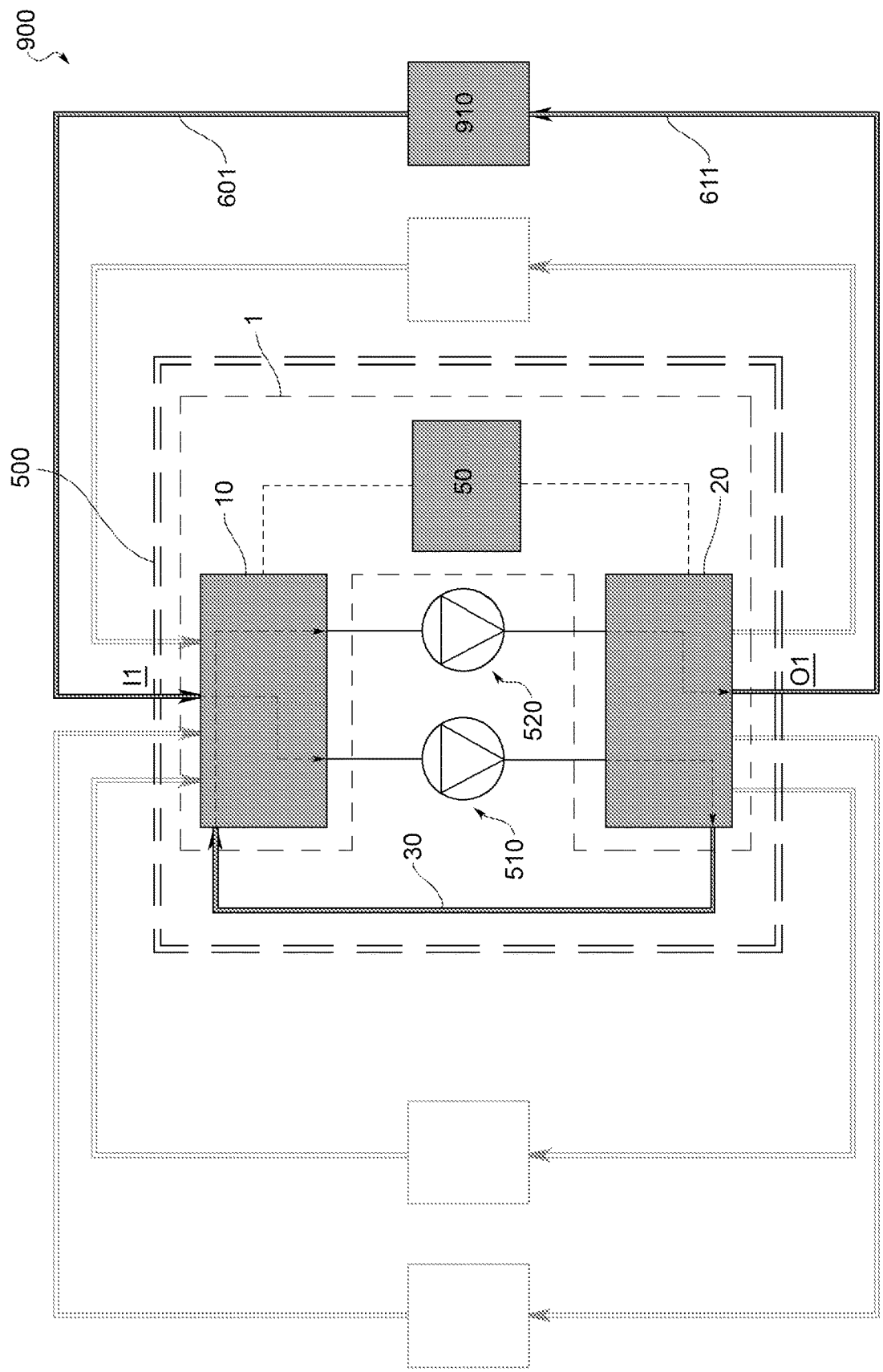
FIG. 2a is a diagrammatic view of a thermal management system according to a first working configuration.
Figure 2A:
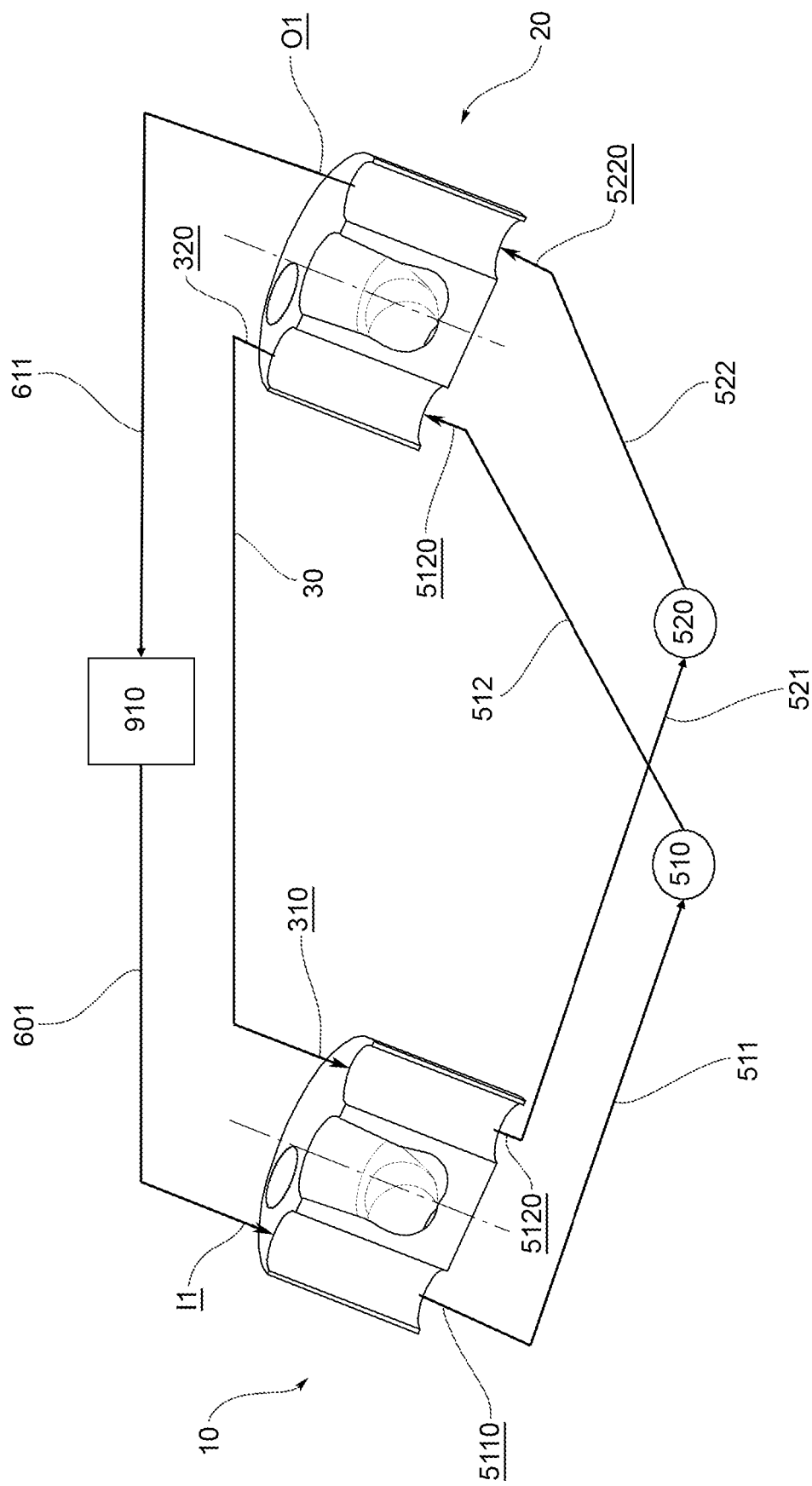

Preferably, the first working configuration is diagrammatically shown by way of example in FIGS. 2a and 2a'.

In other words, in the first working configuration, the fluidic command device 1 is configured to identify a single fluidic circuit in which the temperature of the first operating group 910 is managed. In yet other words, in the first working configuration, the fluidic command device 1 is configured to manage the temperature of the first operating group 910 using the first pump group 510 and the second pump group 520 in series.

Furthermore, according to the present invention, the fluidic command device 1 is configurable in a second working configuration, in which the working fluid flows into the second inlet port I2 and flows out from the second outlet port O2, thus preventing the flow through the other inlet ports and the other outlet ports; in which, between the second inlet port I2 and the second outlet port O2, the working fluid flows both in the first pump group 510 and in the second pump group 520, thus preventing the flow in the auxiliary duct 30.

Figure 2B:
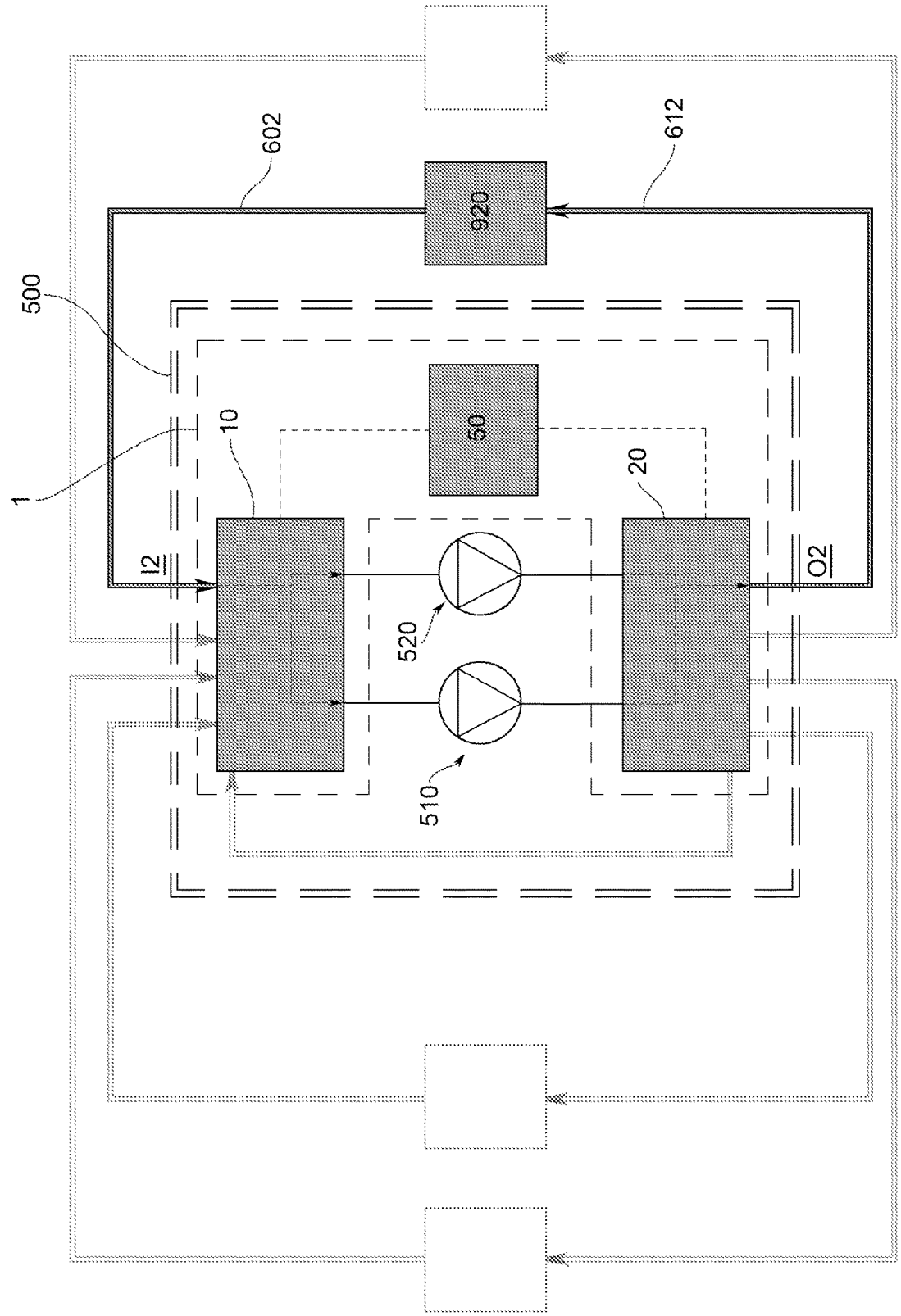
FIG. 2b is a diagrammatic view of a thermal management system according to a second working configuration.

Preferably, the second working configuration is diagrammatically shown by way of example in FIGS. 2b and 2b'.

In other words, in the second working configuration, the fluidic command device 1 is configured to identify a single fluidic circuit in which the temperature of the second operating group 920 is managed. In yet other words, in the second working configuration, the fluidic command device 1 is configured to manage the temperature of the second operating group 920 using the first pump group 510 and the second pump group 520 in parallel.

Furthermore, according to the present invention, the fluidic command device 1 is configurable in a third working configuration, in which the working fluid flows into the third inlet port I3 and flows out from the third outlet port O3, in which between the third inlet port I3 and the third outlet port O3, the working fluid flows into the first pump group 510, and in which the working fluid flows into the fourth inlet port I4 and flows out from the fourth outlet port O4, in which between the fourth inlet port I4 and the fourth outlet port O4, the working fluid flows into the second pump group 520.

Figure 2C:
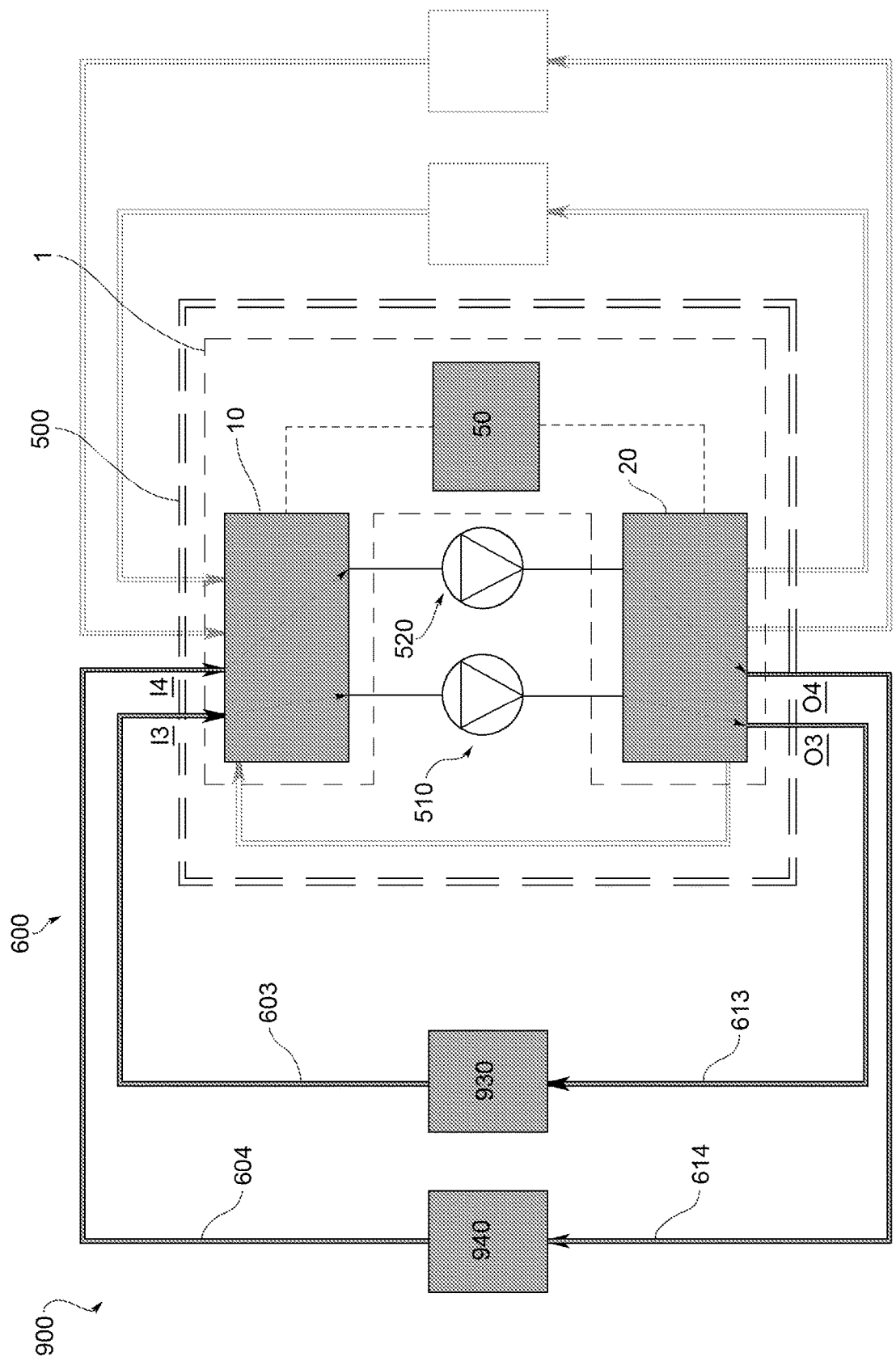
FIG. 2c is a diagrammatic view of a thermal management system according to a third working configuration.
Figure 2C:
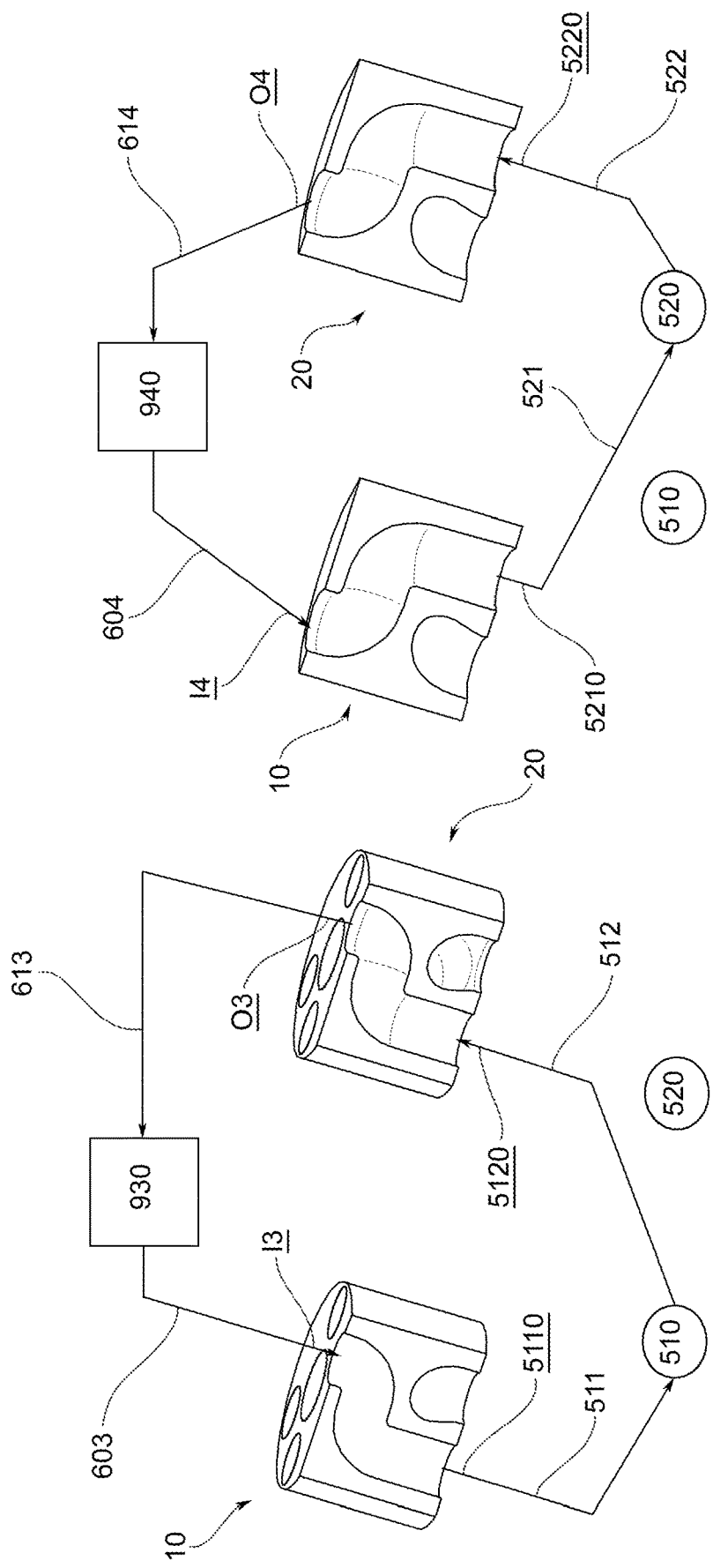
Figure 3A:
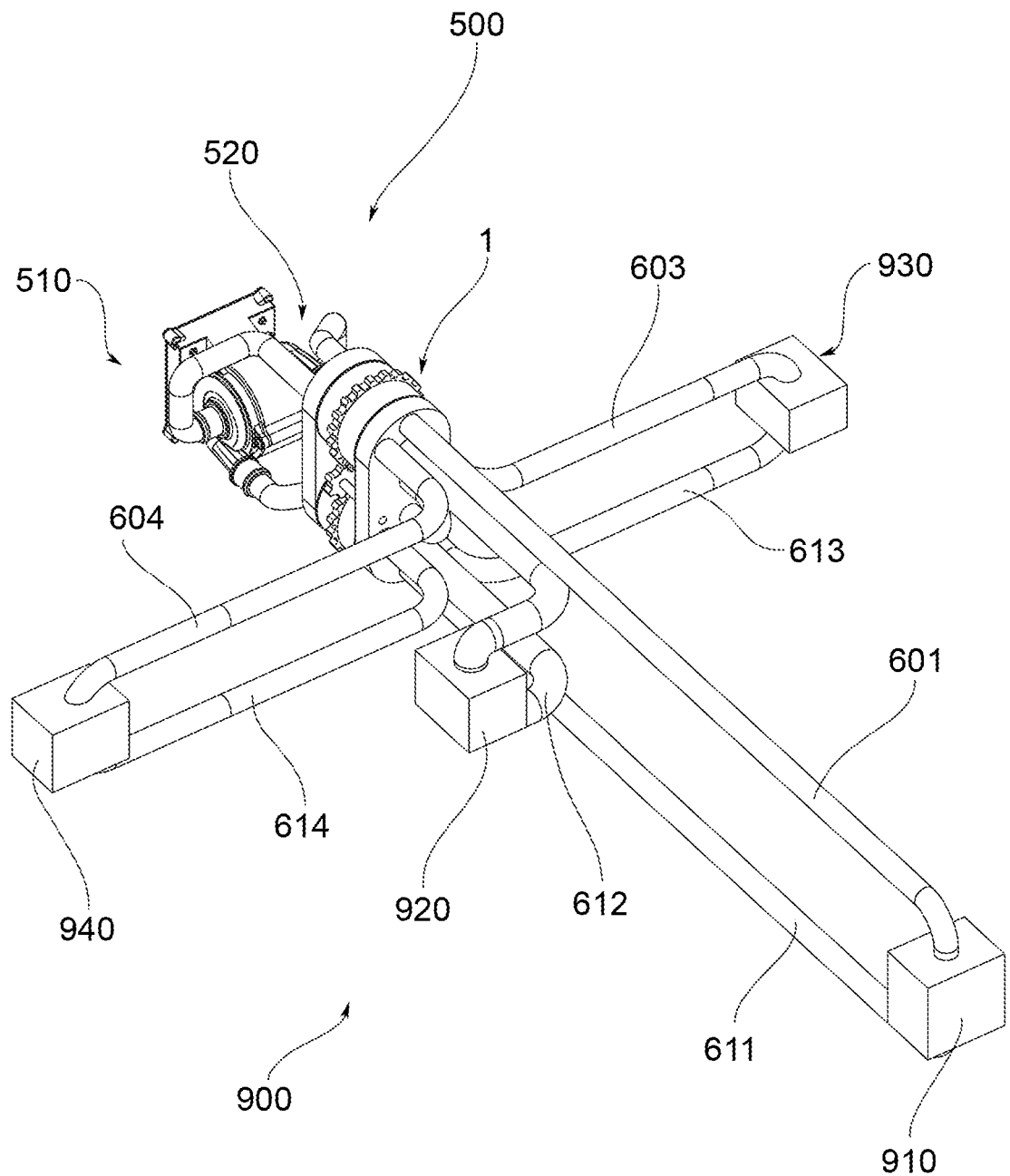
FIGS. 3a and 3b are two diagrammatic perspective views of the thermal regulation system of the present invention.
Figure 3B:
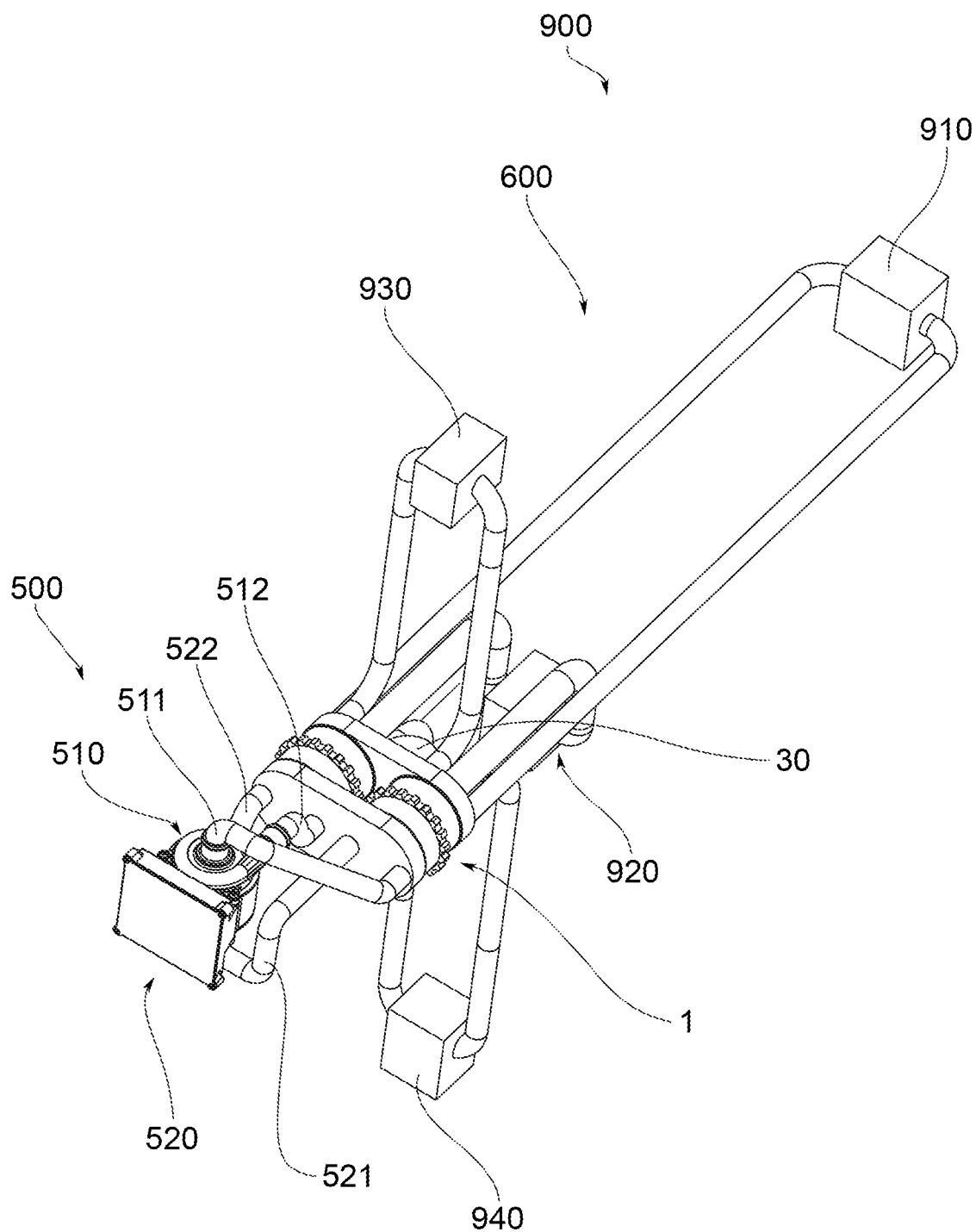
Figure 4A:
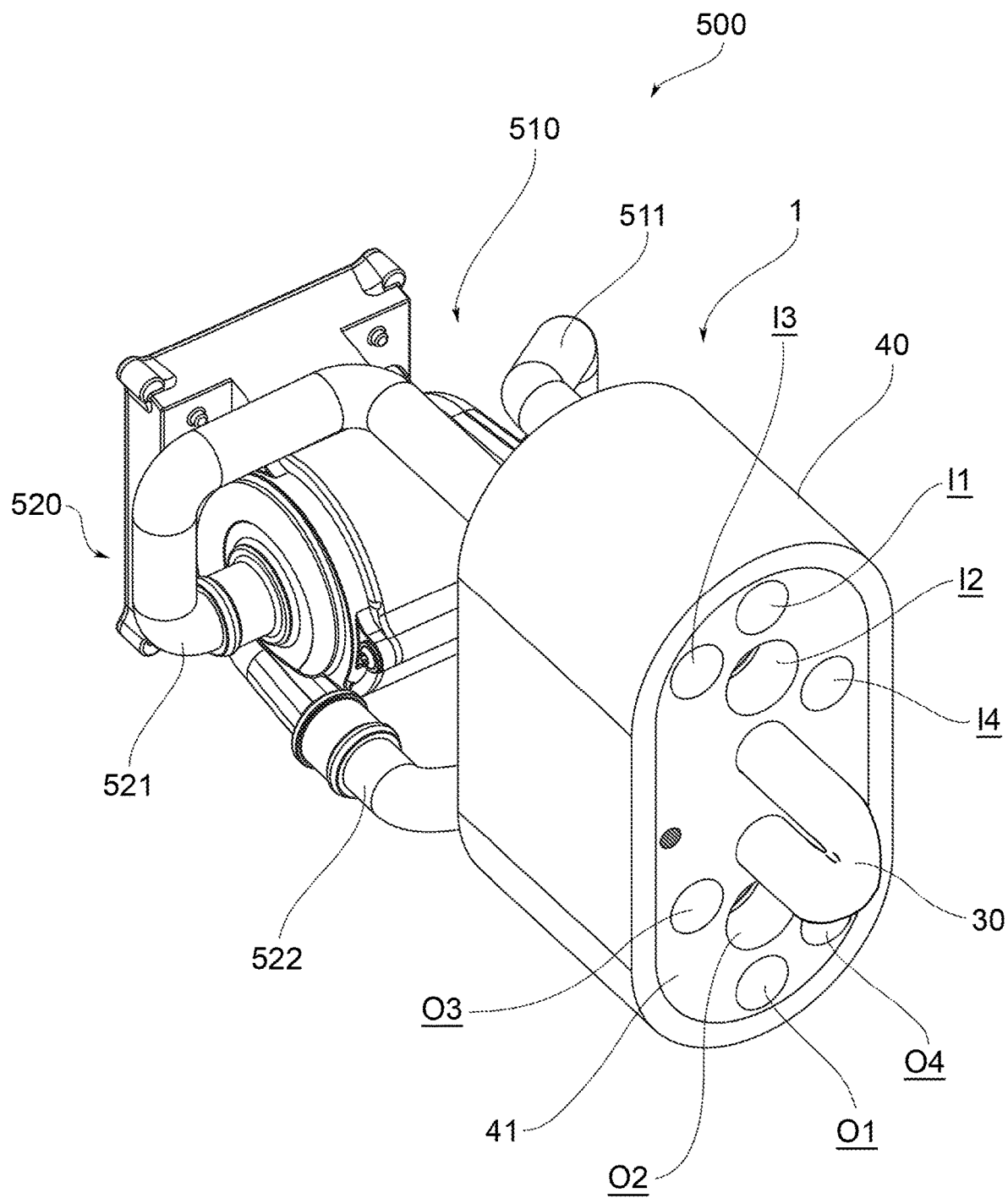
FIGS. 4a and 4b are two perspective views of the thermal management assembly of the present invention according to a preferred embodiment.
Figure 4B:
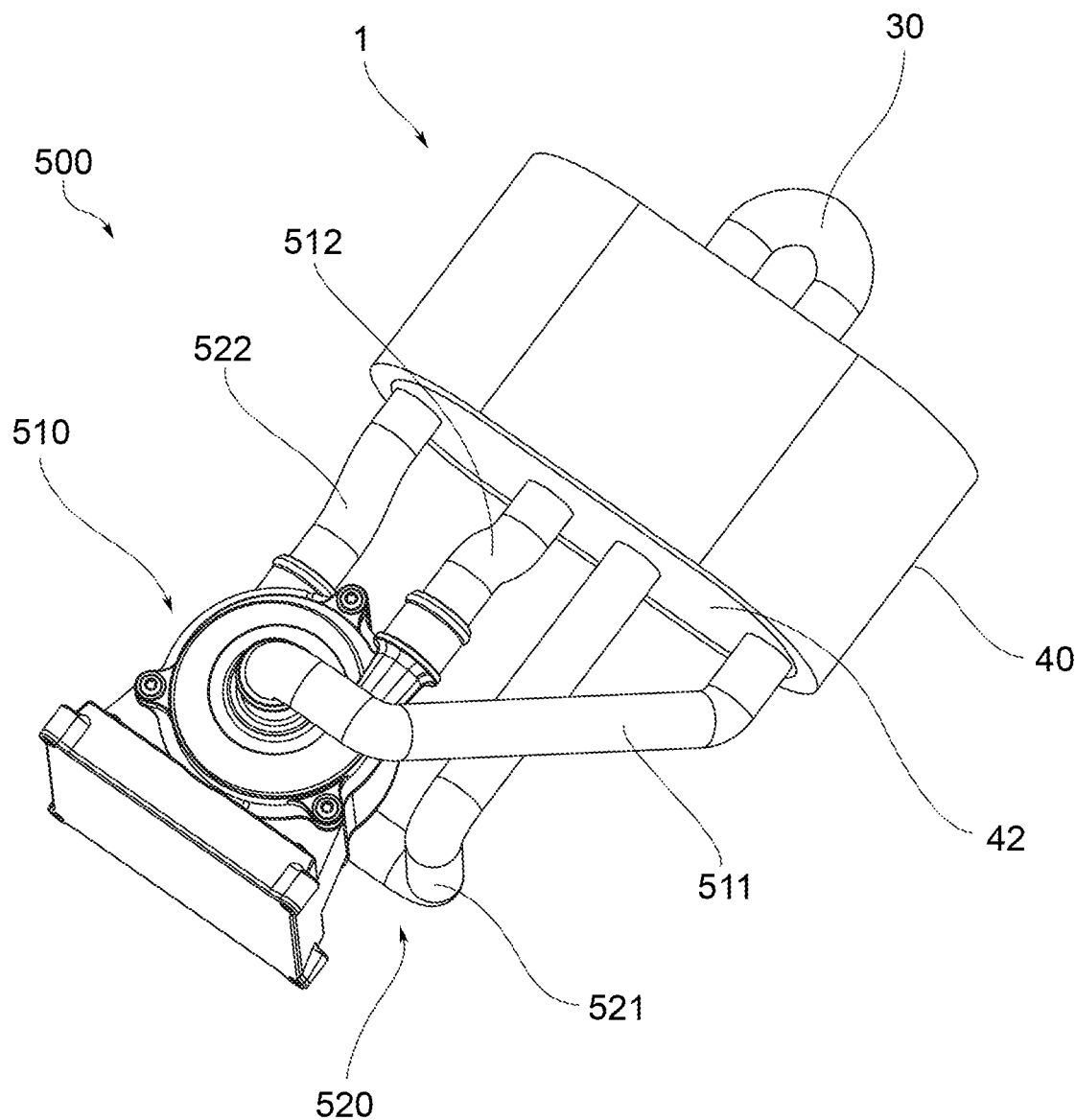
Figure 5A:
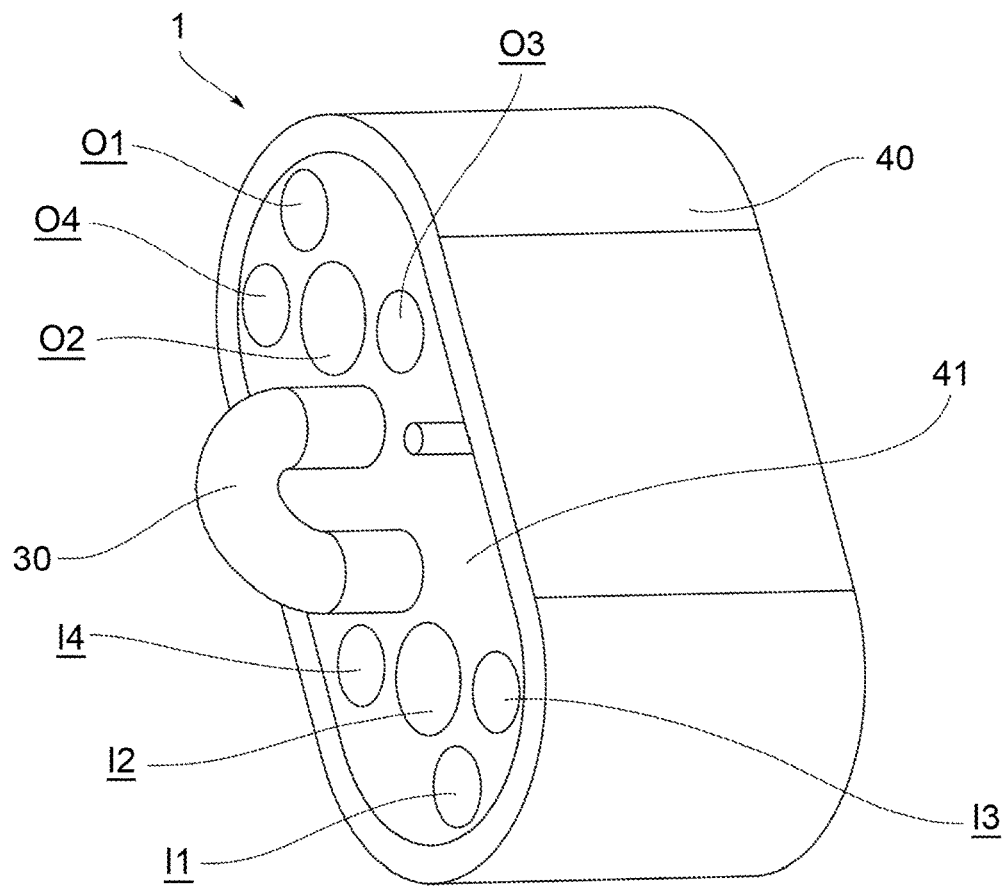
FIGS. 5a and 5b are two perspective views of the fluidic command device comprised in the thermal management assembly shown in the figures above.
Figure 5B:
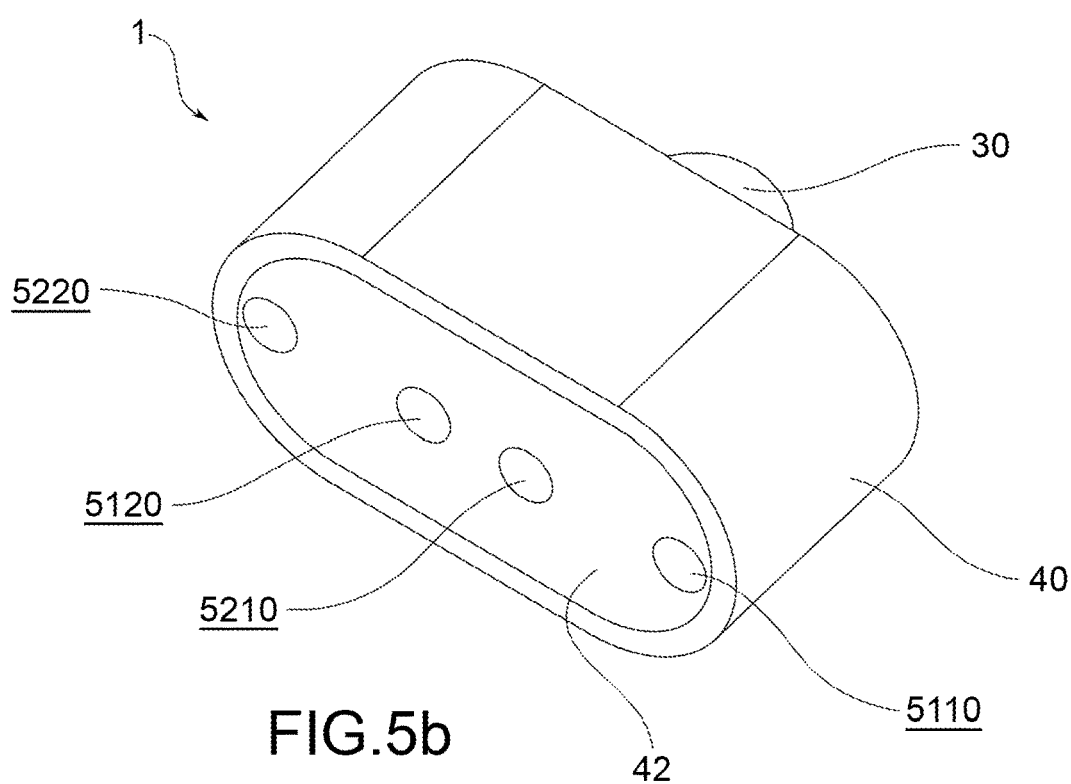
Figure 6A:
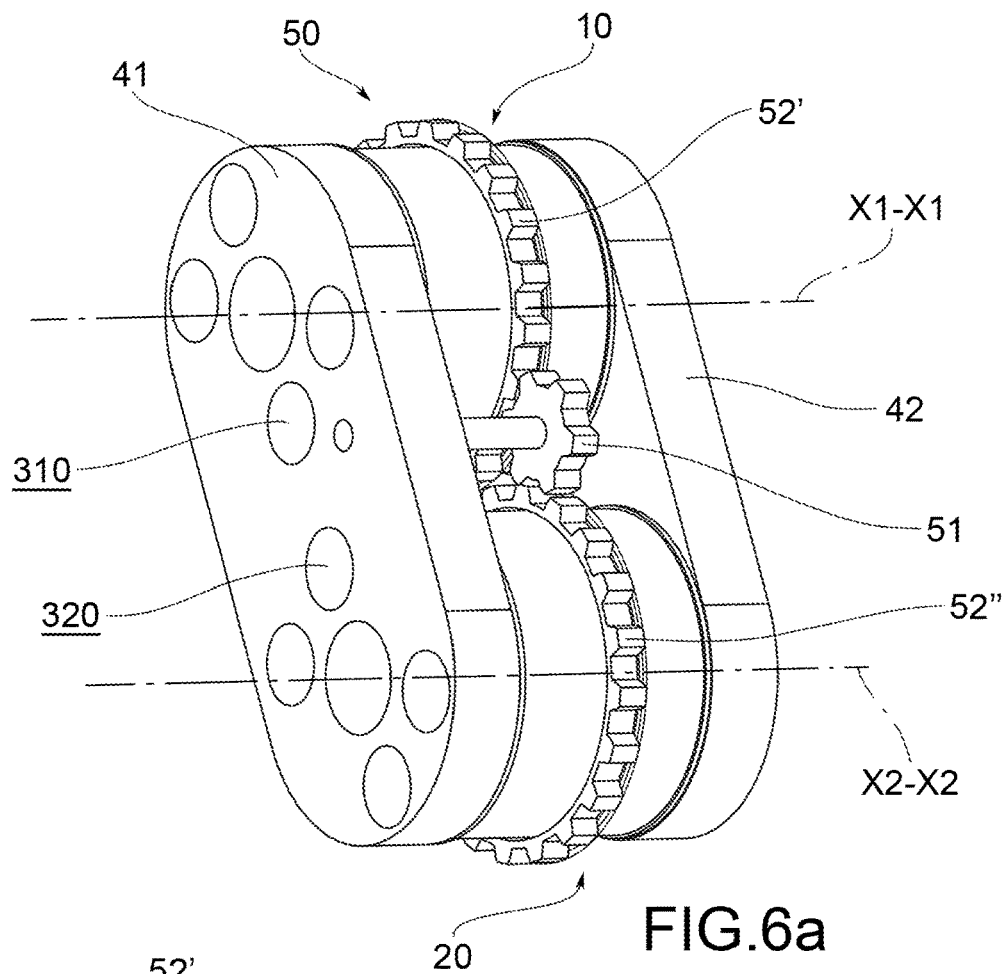
FIGS. 6a and 6b are two perspective views of some components comprised in the fluidic command device shown in FIGS. 5a and 5b.
Figure 6B:
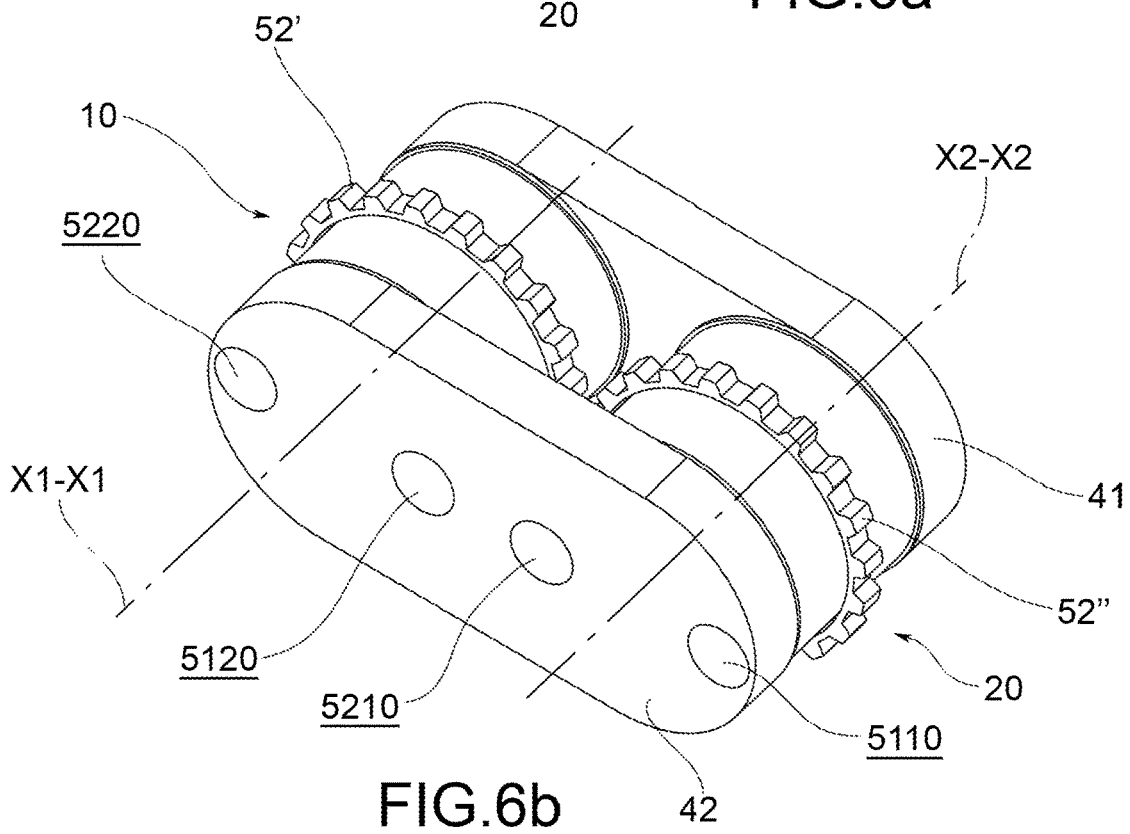

Preferably, the third working configuration is diagrammatically shown by way of example in FIGS. 2c and 2c'.

In other words, in the third working configuration, the fluidic command device 1 is configured to identify two distinct fluidic circuits in which the temperature of the third operating group 930 and of the fourth operating group 940 is managed. In other words, in the third working configuration, the fluidic command device 1 is configured to manage the temperature of the third operating group 930 using one of the two pump groups, e.g. the first pump group 510, and to manage the temperature of the fourth operating group 940 using the remaining pump group, e.g. the second pump group 520.

According to a preferred embodiment, the fluidic command device 1 comprises a first command valve element 10 and a second command valve element 20. According to the above, each working configuration corresponds to the regulation of each command valve element 10, 20 to a predetermined position.

According to a preferred embodiment, the first command valve element 10 is fluidically connected on one side to the four inlet ports I1, I2, I3, I4 and the first end of the auxiliary duct 30 and on the other side to the first inlet duct 511 and the second inlet duct 521. In other words, the first command valve element 10 is fluidically connected on one side to the operating groups and on the other side to the first pump group 510 and the second pump group 520. In yet other words, the first command valve element 10 is suitable for receiving working fluid from the operating groups on the other side to direct it towards the first pump group 510 and/or the second pump group 520.

According to a preferred embodiment, the second command valve element 20 is fluidically connected on one side to the first outlet duct 512 and second outlet duct 522 and on the other side to a second end of the auxiliary duct 32 and the four outlet ports O1, O2, O3, O4. In other words, the second command valve element 20 is fluidically connected on one side to the first pump group 510 and to the second pump group 520 and on the other side to the operating groups. In yet other words, the second command valve element 20 is suitable for receiving working fluid from the first pump group 510 and/or the second pump group 520 to direct it towards the operating groups.

According to a preferred embodiment, both the first command valve element 10 and the second command valve element 20 comprise therein a plurality of command sections, the positioning of which is such as to direct the flow of the working fluid from one side to the other of the respective command valve element.

According to a preferred embodiment, the first command valve element 10 extends along a first axis X1-X1. The aforesaid different working configurations correspond to different angular positions of the first command valve element 10 with respect to the first axis X1-X1.

According to a preferred embodiment, the second command valve element 20 extends along a second axis X2-X2. The aforesaid different working configurations correspond to different angular positions of the second command valve element 20 with respect to the second axis X2-X2.

According to a preferred embodiment, the first axis X1-X1 and the second axis X2-X2 extend parallel to each other.

Preferably, the first command valve element 10 and the second command valve element 20 are angularly positionable independently of each other.

Preferably, the first command valve element 10 and the second command valve element 20 are angularly positionable simultaneously with each other.

According to a preferred embodiment, the fluidic command device 1 comprises command means 50 operatively connected to the first command valve element 10 and the second command valve element 20 suitable to command them to a preferred angular position.

According to a preferred embodiment, said command means 50 comprise an active member 51, a first passive member 52' engaged with the active member 51 and the first valve command element 10, and a second passive member 52" engaged with the active member 51 and the second valve command element 20.

Preferably, the action of the active member 51 corresponds to a rotation of the first passive member 52' and therefore of the first command valve element 10, and to a rotation of the second passive member 52" and therefore of the second command valve element 20.

According to a preferred embodiment, the active member 51 comprises a gear and the first passive member 52', and the second passive member 52" comprise further gears, respectively, meshing with the active member 51.

Preferably, the first passive member 52' and the second passive member 52" extend about the first axis X1-X1 and the second axis X2-X2, respectively.

According to a preferred embodiment, the active member 51 is positioned between the first command valve element 10 and the second command valve element 20.

According to a preferred embodiment, the active member 51 and the passive members 52', 52" are directly engaged with each other.

In further variants, the active member 51 and the passive members 52', 52" are indirectly engaged with each other, e.g. by means of additional motion transmission components, such as other gears or belt elements.

According to a preferred embodiment, the fluidic command device 1 comprising a device body 40 suitable to contain the first command valve element 10 and the second command valve element 20.

Preferably, the device body 40 comprises a first connecting flange 41 and a second connecting flange 42. According to a preferred embodiment, the first command valve element 10 and the second command valve element 20 are mounted between the first connecting flange 41 and the second connecting flange 42.

According to a preferred embodiment, the first connecting flange 41 comprises the four inlet ports I1, I2, I3, I4, and the four outlet ports O1, O2, O3, O4.

Furthermore, according to a preferred embodiment, the first connecting flange 41 further comprises the first auxiliary port 310 which is connectable to the first end of the auxiliary duct 30, and the second auxiliary port 320 which is connectable to the second end of the auxiliary duct 32.

According to a preferred embodiment, the second connecting flange 42 comprises two pairs of ports for the connection with the first pump group 510 and the second pump group 520, respectively.

In particular, the first pair of connection ports 5110, 5210 are suitable for connecting fluidically the first inlet duct 511 and the second inlet duct 521.

Said first pair of connection ports 5110, 5210 is fluidically connected to the first command valve element 10.

In particular, the second pair of connection ports 5120, 5220 is suitable for putting the first outlet duct 512 and the second outlet duct 522 into fluidic communication.

Said second pair of connection ports 5120, 5220 is fluidically connected to the second command valve element 20.

As shown by way of example in the accompanying figures, the first command valve element 10 and the second command valve element 20 comprise said command sections, the development of which is such as to direct the flow of working fluid between one connecting flange and the other, and therefore between the various components fluidically connected to said flanges. As can be seen in the accompanying figures, some command sections are suitable for joining two inlet flows into a single outlet flow, or vice versa. Or, as can be seen in the accompanying figures, some command sections are suitable to connect a respective inlet with a respective outlet.

Preferably, as shown by way of example, the fluidic command device 1 is highly compact in size so that it is suitable for being accommodated in the engine compartment of a vehicle.

Preferably, the two pump groups have the features described in document 102018000010971 to the Applicant, as also shown as an example in the accompanying figures.

Additionally, as mentioned, the present invention further relates to the thermal regulation system 600 of a vehicle, which comprises said thermal management assembly 500 having the features described above. Said vehicle comprises a first operating group 910, a second operating group 920, a third operating group 930, and a fourth operating group 940, while the thermal regulation system 600 comprises a plurality of system ducts 601, 602, 603, 604, 611, 612, 613, 614 suitable to be fluidically connected the first operating group 910, the second operating group 920, the third operating group 930 and the fourth operating group 940. Furthermore, said system ducts 601, 602, 603, 604, 611, 612, 613, 614 are suitable for being fluidically connected to the described thermal management assembly 500.

The present invention also relates to a vehicle 900 which comprises a first operating group 910, e.g. an endothermic engine group, a second operating group 920, e.g. a first battery group and a second battery group, a third operating group 930, e.g. comprising the first battery group and a first electric motor group, a fourth operating group 940, e.g. comprising the second battery group and a second electric motor group. Furthermore, the vehicle 900 of the present invention further comprises a thermal regulation system 600.

Preferably, said vehicle 900 is hybrid-powered, in which the first operating group 910 is an endothermic engine group, the second operating group 920 is a first battery group and a second battery group, the third operating group 930 is the first battery group and a first electric motor group, the fourth operating group 940 is the second battery group and a second electric motor group.

For example, an embodiment of the vehicle 900 of this type is a vehicle with an endothermic engine group, and which has, for example on an electrically driven axle, an electric power group (with respective battery group) for each wheel group.

Innovatively, the thermal management system, the thermal regulation system of a vehicle which comprises such a management assembly and the vehicle which comprises the thermal regulation system largely fulfill the purpose of the present invention by solving the problems emerged in typical solutions of the prior art.

Indeed, advantageously, the thermal management assembly of the present invention allows the regulation of a plurality of operating groups of the vehicle.

Advantageously, the thermal management assembly of the present invention allows simple management of the temperature of different operating groups of the vehicle, using only two pump groups.

Advantageously, the thermal management assembly is of simple positioning in the vehicle, having a compact size and, therefore, compact overall dimensions.

Advantageously, the thermal management assembly is cost-effective to manufacture.

Advantageously, the thermal management assembly of the present invention manages the temperature of the vehicle in a highly effective and flexible manner.

Advantageously, the thermal management assembly of the present invention manages the temperature of the vehicle in a plurality of different operating conditions, i.e. both in motion and stationary.

Advantageously, the thermal management assembly is suitable, in the first working configuration, for managing the temperature of the endothermic engine group. In other words, in moving vehicle conditions at high rpm and/or high speeds, at which the vehicle is powered endothermically, the thermal management assembly exclusively manages the temperature of said "endothermic drive part".

Advantageously, the thermal management assembly is suitable, in the first configuration, for managing the temperature of an operating group such as the endothermic engine group by virtue of a double working fluid flow.

Advantageously, the thermal management assembly is suitable, in the second configuration, for managing the temperature of two electric motor groups and respective battery groups. In other words, in moving vehicle conditions at low rpm and/or low speeds, at which the vehicle is electrically powered, the thermal management assembly exclusively manages the temperature of said "electric drive part".

Advantageously, the thermal management assembly is suitable in the second configuration to manage the temperature of an operating group with high load losses, such as the battery group, the battery groups, by virtue of a double head. Advantageously, in such a configuration, the temperature of the battery groups is managed separately from the temperature of the respective electric motor groups and, obviously, of the endothermic engine group; for example, this configuration applies in situations in which the vehicle is stationary, e.g. when recharging the battery group, or when starting the vehicle and starting the battery group.

Advantageously, the management of flows in ducts and circuits is highly simplified.

Advantageously, with simple rotational operations, the fluidic management device is suitable for switching from one configuration to another.

Advantageously, with a single rotational operation, the fluidic management device is configurable in the desired working configuration.

In order to meet contingent needs, it is apparent that those skilled in the art can make changes to the thermal management assembly and thermal regulation system, as well as to the vehicle, all of which are contained within the scope of protection as defined by the following claims.

What is claimed is:

1. A thermal management assembly of a thermal regulation system of a vehicle, wherein said vehicle comprises a first operating group, a second operating group, a third operating group and a fourth operating group, wherein the thermal management assembly comprises:
   a first pump group configured to command a movement of a working fluid in the thermal management assembly, said first pump group comprising a first inlet duct and a first outlet duct;
   a second pump group configured to command the movement of the working fluid in the thermal management assembly, said second pump group comprising a second inlet duct and a second outlet duct;
   a fluidic command device, fluidically connected to the first inlet and outlet ducts and to the second inlet and outlet ducts, and comprising:
   a first inlet port, a second inlet port, a third inlet port and a fourth inlet port, each inlet port being fluidically connectable to a respective operating group to allow the working fluid to enter into the fluidic command device;
   a first outlet port, a second outlet port, a third outlet port and a fourth outlet port, each outlet port being fluidically connectable to a respective operating group to allow the working fluid to exit from the fluidic command device; and
   an auxiliary duct, fluidically connecting the first pump group and the second pump group;
   wherein the fluidic command device is configurable in:
   a first working configuration, in which the working fluid flows into the first inlet port and flows out from the first outlet port, preventing flow through the other inlet and outlet ports, wherein between the first inlet port and the first outlet port, the working fluid flows into the first pump group, the auxiliary duct and the second pump group;
   a second working configuration, in which the working fluid flows into the second inlet port and flows out from the second outlet port, preventing flow through the other inlet and outlet ports, wherein between the second inlet port and the second outlet port, the working fluid flows into the first pump group and the second pump group, preventing flow into the auxiliary duct; and
   a third working configuration, in which the working fluid flows into the third inlet port and flows out from the third outlet port, wherein between the third inlet port and the third outlet port, the working fluid flows into the first pump group, and wherein the working fluid flows into the fourth inlet port and flows out from the fourth outlet port, wherein between the fourth inlet port and the fourth outlet port, the working fluid flows into the second pump group.

2. The thermal management assembly of claim 1, wherein the first pump group comprises:
   a first command unit comprising a first impeller, which intercepts the working fluid flowing in the first inlet duct to send the working fluid into the first outlet duct; and
   a first stabilization tank that divides the first inlet duct into a first inlet duct upstream section and a first inlet duct downstream section.

3. The thermal management assembly of claim 1, wherein the second pump group comprises:
   a second command unit comprising a second impeller, which intercepts the working fluid flowing in the second inlet duct to send the working fluid into the second outlet duct; and
   a second stabilization tank that divides the second inlet duct into a second inlet duct upstream section and a second inlet duct downstream section.

4. The thermal management assembly of claim 1, wherein the auxiliary duct fluidically connects the first outlet duct to the second inlet duct.

5. The thermal management assembly of claim 1, wherein the fluidic command device comprises:
   a first command valve element fluidically connected on one side to the first, second, third and fourth inlet ports and to a first end of the auxiliary duct, and on the other side to the first inlet duct and to the second inlet duct; and
   a second command valve element fluidically connected on one side to the first outlet duct and to the second outlet duct, and on the other side to a second end of the auxiliary duct and to the first, second, third and fourth outlet ports.

6. The thermal management assembly of claim 5, wherein the first command valve element and the second command valve element comprise a plurality of command sections, positioning of which is such to direct the flow of the working fluid from one side to the other of a respective command valve element.

7. The thermal management assembly of claim 5, wherein the first command valve element extends along a first axis (X1-X1) and the second command valve element extends along a second axis (X2-X2), wherein different working configurations correspond to different angular positions of the first command valve element with respect to the first axis (X1-X1) and the second command valve element with respect to the second axis (X2-X2).

8. The thermal management assembly of claim 7, wherein the fluidic command device comprises command devices operatively connected to the first command valve element and the second command valve element for commanding the first and second command valve elements to a preferred angular position.

9. The thermal management assembly of claim 8, wherein said command devices comprise an active member, a first passive member engaged with the active member and the first command valve element, and a second passive member engaged with the active member and the second command valve element so that an action of the active member corresponds to a rotation of the first passive member, and of the first command valve element, and to a rotation of the second passive member and of the second command valve element.

10. The thermal management assembly of claim 9, wherein the active member comprises a gear, and the first passive member and the second passive member comprise further gears, respectively, meshing the active member, extending about the first axis (X1-X1) and the second axis (X2-X2), respectively.

11. The thermal management assembly of claim 1, wherein the fluidic command device comprises:
- a first command valve element fluidically connected on one side to the first, second, third and fourth inlet ports and to a first end of the auxiliary duct, and on the other side to the first inlet duct and to the second inlet duct; and
- a second command valve element fluidically connected on one side to the first outlet duct and to the second outlet duct, and on the other side to a second end of the auxiliary duct and to the first, second, third and fourth outlet ports, wherein the fluidic command device comprises a device body configured to contain the first command valve element and the second command valve element, wherein the device body comprises a first connecting flange and a second connecting flange, and wherein the first command valve element and the second command valve element are mounted between the first connecting flange and the second connecting flange.

12. The thermal management assembly of claim 11, wherein the first connecting flange comprises the first, second, third and fourth inlet ports and the first, second, third and fourth outlet ports.

13. The thermal management assembly of claim 12, wherein the first connecting flange further comprises a first auxiliary port connectable to the first end of the auxiliary duct, and a second auxiliary port connectable to the second end of the auxiliary duct.

14. A thermal regulation system of a vehicle, wherein said vehicle comprises a first operating group, a second operating group, a third operating group and a fourth operating group, wherein said thermal regulation system comprises:
- a plurality of system ducts fluidically connected to the first operating group, the second operating group, the third operating group and the fourth operating group; and
- a thermal management assembly according to claim 1, fluidically connected to said plurality of system ducts.

15. A vehicle comprising a first operating group, a second operating group, a third operating group, a fourth operating group, and a thermal regulation system according to claim 14.

16. The vehicle of claim 15, wherein said vehicle is a hybrid-powered vehicle, and wherein the first operating group comprises an endothermic engine group, the second operating group comprises a first battery group and a second battery group, the third operating group comprises the first battery group and a first electric engine group, and the fourth operating group comprises the second battery group and a second electric engine group.

17. The thermal management assembly of claim 3, wherein the auxiliary duct fluidically connects the first outlet duct to the second inlet duct upstream of the second stabilization tank.

* * * * *